US007251372B2

(12) United States Patent
Wood

(10) Patent No.: US 7,251,372 B2
(45) Date of Patent: Jul. 31, 2007

(54) METHOD AND SYSTEM FOR COMPRESSING DIGITIZED FINGERPRINT IMAGES BY A UNIFORM DEGREE OF COMPRESSION

(75) Inventor: Gordon Astor Wood, Carmichael, CA (US)

(73) Assignee: NEC Solutions (America) Inc., Rancho Cordova, CA (US)

(*) Notice: Subject to any disclaimer, the term of this patent is extended or adjusted under 35 U.S.C. 154(b) by 739 days.

(21) Appl. No.: 10/757,142

(22) Filed: Jan. 14, 2004

(65) Prior Publication Data

US 2005/0152606 A1 Jul. 14, 2005

(51) Int. Cl.
*G06K 9/36* (2006.01)
*G06K 9/46* (2006.01)

(52) U.S. Cl. ............... 382/239; 382/232; 382/238; 382/250; 341/50; 348/419.1

(58) Field of Classification Search ............... 382/232, 382/233, 236, 238, 239, 240, 245, 246, 250, 382/251, 253; 341/50, 51; 348/404.1, 407.1, 348/419.1; 358/426.02, 426.09, 426.11
See application file for complete search history.

(56) References Cited

U.S. PATENT DOCUMENTS 5,923,376 A * 7/1999 Pullen et al. .......... 375/240.16

(Continued)

OTHER PUBLICATIONS

"Information Technology—Digital Compression and Coding of Continuous-Tone Still Images: Requirements and Guidelines", 1994, pp. i-182.

(Continued)

*Primary Examiner*—Matthew C. Bella
*Assistant Examiner*—Ali Bayat
(74) *Attorney, Agent, or Firm*—Foley & Lardner LLP

(57) ABSTRACT

A method and a system are described for achieving a desired value for the magnitude of compression when compressing the information contained in a digitized fingerprint images. A lossy compression method is used that includes use of a compression parameter whose value may be varied to adjust the amount of compression actually achieved. Briefly summarized, the method comprises selecting a first value for the compression parameter and then performing a first compression of the information contained in a digitized fingerprint image using the first value for the compression parameter and using the lossy compression method, thereby producing a first set of compressed information. Next, a first value for the magnitude of compression is computed from the quantity of information that is contained in the digitized fingerprint image and also from the quantity of information that is contained in the first set of compressed information. Then a first pair of values is formed which first pair includes the first value for the magnitude of compression and the first value for the compression parameter. Interpolation is then performed, using the first pair of values, a second pair of values, and a first new pair of values which first new pair includes the desired value for the magnitude of compression and an as yet unknown first new value for the compression parameter. In this interpolation, a value for this first new value for the compression parameter is determined by computing its value from the remaining five values. Finally, a new compression of the fingerprint image information is performed using this first new value for the compression parameter. This produces a new set of compressed information that is compressed close to the desired value.

30 Claims, 9 Drawing Sheets

U.S. PATENT DOCUMENTS

| | | | |
|---|---|---|---|
| 6,356,668 B1* | 3/2002 | Honsinger et al. | 382/251 |
| 6,870,963 B2* | 3/2005 | Govindaswamy et al. | 382/250 |
| 2004/0047511 A1* | 3/2004 | Tzannes et al. | 382/232 |
| 2006/0171465 A1* | 8/2006 | Thyagarajan | 375/240.23 |

OTHER PUBLICATIONS

"Electronic Fingerprint Transmission Specification", Jan. 1999, pp. ii-185, (Criminal Justice Information Services(CJIS)).

"Criminal Justice Information Services (CJIS)", Dec. 1997, pp. 1-48, (Criminal Justice Information Services Division).

* cited by examiner

METHOD AND SYSTEM FOR COMPRESSING DIGITIZED FINGERPRINT IMAGES BY A UNIFORM DEGREE OF COMPRESSION

BACKGROUND OF THE INVENTION

1. Field of the Invention

The present invention relates generally to compression of images, and more particularly to methods and devices for compressing digitized fingerprint images to a specific compression ratio.

2. Description of the Related Art

Compressing computer information is frequently a desirable way to store more data in less space. If each file or record can be made smaller without loss of data, then the cost of storage is reduced. This is particularly true when the number of files or records is very large.

There are many possible ways in which files may be compressed, but generally speaking they may be divided into two broad categories:

First, there are information compression methods (or algorithms) that preserve the original information exactly. These may be called lossless compression methods (or algorithms or encoders). For example, in a compression method called "run length encoding," one compresses a string of digits such as "1000000200500001000000000300" down to something similar to "1X2X5X1X3X" where each "X" represents a small packet of information containing the duplicated character (in all of these examples, the duplicated character is a "0") and also the number of times the duplicated character occurred in the original string. Later, one may decompress this information by restoring the correct number of the duplicated values at each position. Following decompression, the original image is reconstructed precisely as it was before compression.

In this example, 28 data values were compressed down to about 20 data values depending on the specifics of the implementation. Run length encoding is particularly well-suited for use in compressing data sets that contain many consecutive duplicated values, such as text or technical drawings printed in black upon a uniform white background. Other types of information, containing other types of repetitive patterns that allow for compression, should preferably be compressed using other compression schemes optimized in accordance with the nature of the repetitive patterns in the information. More generally, lossless compression schemes can automatically identify repeated patterns in the information and replace such patterns with identification tags that occupy little space. Compression methods or encoders that first identify and then replace all types of repetitive patterns with tags, in general, are called entropy encoders, since they compress information in whatever way they can to maximize the entropy (or randomness) of the information after compression. A widely used lossless image compression method is named TIFF, or "Tagged Image File Format." The best of the lossless compression schemes can, at times, reduce the volume of information by 50% or more, depending upon how many repetitive patterns the information contains. Lossless methods of compression are mandatory when one is compressing text, computer object programs, financial databases, and the like.

Second, there are information compression methods (or algorithms) that do not preserve the original information precisely, but that lose some information. These are called lossy compression methods (or algorithms or encoders).

Lossy compression methods are particularly well suited for digitized images because it is possible to lose substantial amounts of information and still have a recognizable image. These lossy methods achieve a much higher degree of compression than can be achieved using lossless methods. The difficulty is to choose a lossy method and degree of compression which loses enough information to make the effort worthwhile and yet retains enough detail to make the image useful. In other words, a method should be selected that causes the image to appear the same to a human observer both before and after compression.

Consider the fingerprint image shown in FIG. 1. Assume that this image is a grayscale image, where every pixel is represented within a computer by a numeric value between 0 and 255, with each possible value representing a different shade of gray. (Because of the process used to print this patent, the image shown in FIG. 1 is actually a bitmap image, where every image pixel is either pure black or pure white. For purposes of this discussion, the reader is asked to assume that the pixels in FIG. 1 appear in many different shades of gray ranging from very light gray to very dark gray.)

One can compress such a gray-scale fingerprint image using a lossless compression method, such as run length encoding or TIFF, and one may thereby preserve all of the image's information content. But lossless compression cannot achieve sufficient compression to minimize storage space and transmission times adequately.

As a very simple example of how one may increase compression by permitting some unimportant information to be lost, one may proceed as follows: Just prior to carrying out such a lossless compression, one may, as a preliminary step, transform all of the light gray to white pixels falling in the regions surrounding the central fingerprint image, including any darker smudges, into pure white pixels. The information representing this image now contains many consecutive values of pure white used to represent the brightness of regions surrounding the central fingerprint image. In this simple manner, and with very little (if any) loss of useful information (from the point of view of fingerprint analysis and comparison), one thereby transforms a normal fingerprint image into a slightly modified image that is now more compressible than the original.

The image is then compressed using, for example, run length encoding (as was explained above). The run length encoding compresses all of the values representing pixel brightness in the regions surrounding the central fingerprint image down into a very small amount of information. Adopting this very simple lossy compression scheme can double the amount of compression that is achievable with virtually no loss of useful information.

Practical lossy image compression methods are in widespread use today. They work in essentially the same manner as the method just described, but they are considerably more sophisticated in the way in which they choose which information to discard.

JPEG (See ISO International Standard 10918-1, "Information Technology—Digital Compression and Coding of Continuous Tone Still Images," "Part 1—Requirements and Guidelines") is a lossy compression method (or algorithm or encoder) that is used by the UK's Home Office to compress fingerprint images. It is typical of such methods (or algorithms or encoders).

JPEG begins by breaking up an image into small square arrays of pixels. Each square array of pixels is represented within JPEG by a square array of numeric values each representing the grayscale values of a pixel. JPEG next performs what is called a two-dimensional cosine transformation. This is performed on all the pixel grayscale values within each square array, thus transforming each square array of pixel grayscale values into an identically-sized, corresponding square array of two-dimensional frequency values. This process is essentially analogous to performing a two-dimensional Fourier transformation upon the values.

Then, using an array of integers identical in size to the array of frequency values, and using array (or matrix) division, JPEG divides each individual frequency component by a corresponding integer value. This is done using integer division—any remainder is discarded. JPEG thereby achieves a carefully-controlled truncation of each frequency value. This is the point at which some information is lost. The truncation process forces many of the frequency values to go to zero, permitting them to be compressed through run length or entropy encoding applied as a later step. This truncation process also permits many of the remaining truncated frequency values to be represented by fewer than eight data bits, also at a later step, thereby reducing substantially the number of data bits that are needed to represent the remaining non-zero frequency components.

After arranging all of the truncated frequency values in order by frequency, to form a linear string of data values, JPEG finally carries out the compression step. First, it compresses the strings of zero values through run length encoding (or entropy encoding). Then, it uses as few data bits as possible to represent each of the truncated, non-zero data values that remain in this linear string. In this manner, JPEG in general often achieves "compression ratios" (or, more generally speaking, magnitudes of compression, however expressed) approaching or exceeding 90-to-1 without noticeable loss of image quality visible to the human eye (when an image is later decompressed). Since the truncation process is applied only to the image information when it is represented as spatial frequency values (and not when it is represented as grayscale values), the human eye has great difficulty discerning any loss of information in the decompressed image.

JPEG allows one to adjust the compression ratio, or magnitude of compression, that is achieved by JPEG. To do this, one varies the values of the integers that are contained within the integer array which JPEG uses as a divisor when truncating the frequency component values. In general, larger integers achieve more compression and less accuracy, and smaller integers achieve less compression and greater accuracy.

As an example of compression ratio (or magnitude of compression) adjustment, consider an MPEG digital television system, such as domestic satellite television, that transmits compressed digital representations of video images through channels that have fixed information transfer rates per second. MPEG digitized video encoders, which are widely used to compress and encode motion-picture and video images prior to their transmission, encode many individual frames of video using what amounts to JPEG. Thus, JPEG compression is utilized within all MPEG video encoders.

MPEG video encoders constantly monitor and adjust the average amount of compression that they are achieving. Whenever the video information per second generated by an MPEG encoder increases and threatens to exceed the available bandwidth of an information channel, the MPEG encoder adjusts upwards the integer values within the array of integers used for truncation. This increases the degree of compression and reduces the amount of information generated per second. When the information generated per second later decreases, the encoder adjusts these same values downwards again and thereby increases the quality of the transmitted video. In this manner, the video images transmitted are kept as accurate as possible consistent with preventing the encoder's outflow of information from exceeding the channel's information per second capacity.

As this MPEG example illustrates, most lossy compression methods (or algorithms or encoders) accept as a control input some parameter or value or array. By varying this parameter, one may vary, up or down, the amount of overall compression that is achieved. This enables one actively to adjust the tradeoff that occurs between the degree of compression that is achieved and the degree of information loss and image degradation that occurs.

In the discussion which follows, any such control parameter, regardless of its form, is called a "compression parameter." Such a parameter can be a single numeric value that, in some cases, may be expressed as a requested or desired compression ratio, such as 9-to-1; or such a parameter can be an array of several numeric values, as it is in the case of JPEG and MPEG, that permits one, by varying different values in the array, to adjust independently the amount of information loss that occurs at different spatial frequencies, for example. Regardless of whether the compression parameter is expressed as a single value or as an array, in the discussion which follows, "variation" or "adjustment" of this "compression parameter" means any variation or adjustment that affects generally the amount of information that is lost during compression and that can be varied reasonably continuously (possibly in discrete steps) over a controllable range of adjustment.

In the field of fingerprint analysis, it is clearly desirable to compress fingerprint images both to achieve compact long-term storage and also to reduce transmission time and required channel capacity. However, a person accused of a crime may be set free or sentenced to a lengthy prison term based upon fingerprint images. Accordingly, it is essential to preserve the details of each fingerprint image to insure the accuracy of the process that is carried out by a fingerprint examiner when comparing two fingerprints and by computers when searching through large databases of fingerprints.

The Federal Bureau of Investigation, in designing its databases that hold tens of millions of fingerprint images, has addressed these issues and has made decisions that have now become de facto standards for fingerprint image storage and transmission. The FBI digitizes the national fingerprint database by taking 500 pixel samples per linear inch of image, with a pixel grayscale resolution of 8 data bits (or one byte) per pixel, thus assigning a grayscale value of between 0 and 255 to each of 500 pixels in every linear inch of pixels. Each fingerprint is thus represented by in the neighborhood of 5,000,000 to 10,000,000 bits of information. A rolled finger may be represented by an array of pixels 750 high by 800 wide (1.5 by 1.6 inches); a plain thumb impression may be represented by an array of pixels 1000 high by 500 wide (2.0 by 1.0 inches). (These are the normally recommended maximum sizes for such arrays. See Section 3.9.4 of CJIS-RS-0010(V7) Electronic Fingerprint Transmission specification (Jan. 29, 1999)).

Over the years, the FBI has investigated several different lossy compression methods and tested their use with fingerprint images. The FBI finally selected a lossy compression method named Wavelet Scalar Quantization (or WSQ). The FBI has also determined that a suitable balance (or compromise) between the cost of storage and transmission on the one hand and the preservation of image quality on the other hand is achieved by compressing each fingerprint image by 15-to-1 using the WSQ method of compression. Accordingly, an FBI standard now mandates that all criminal justice agencies throughout the country compress their fingerprint images using WSQ in such a manner as to achieve a compression ratio of 15-to-1. (For a detailed technical description of WSQ, see IAFIS-IC-0110(V3) Wavelet Sector Quantization (WSQ) Grayscale Fingerprint Image Compression Specification (Dec. 19, 1997)). Programs for performing WSQ compression are widely available commercially. In the discussion which follows, a target compression ratio, such as the FBI's designated ratio of 15-to-1, is called a "desired compression ratio."

The problem that remains is how to achieve this desired or mandated goal of 15-to-1 compression. In practice, very few fingerprint images are actually compressed by the ratio of 15-to-1. Even the FBI itself does not achieve this compression ratio in most cases.

This is because the degree of compression achieved depends to a large measure upon the nature of the fingerprint image undergoing compression. The more repeated patterns such an image contains, the more the image may be compressed by any given compression algorithm. Fingerprint images that contain larger areas of uniformity or larger areas of repeated spatial frequency patterns are thus more compressible than are fingerprint images that are more random.

Computer implementations of the WSQ method typically permit one to specify a compression parameter that may be thought of as a desired or requested compression ratio. Of course, since the actual compression ratio achieved is always a variable function of the particular fingerprint image data supplied, the compression ratio desired or requested is not normally the ratio actually achieved when the WSQ method is actually carried out on an actual fingerprint image.

As an illustration of this, FIG. 2 presents a columnar table that shows what typically happens when one uses the WSQ method to compress 140 different fingerprint images, each time providing the same compression parameter to the WSQ encoder, requesting a 9-to-1 compression ratio. FIG. 2 reveals that 67 of the 140 images, those represented by the chart's two central bars, were compressed such that their achieved compression ratios fall within the range that extends from 14-to-1 up to just below 16-to-1. The left-most bar indicates that eight of the 140 images were compressed by about 11-to-1, while the right-most bar indicates that four of the images were compressed by about 18-to-1. This chart illustrates that there are wide variations in the compressibility of actual fingerprint images when compressed using the WSQ method, even when the compression parameter is kept fixed at the value corresponding to a requested compression ratio of 9-to-1.

Even though the majority of the 140 fingerprint images were compressed somewhat close to the FBI's standard of 15-to-1, one cannot, in general, predict how much any specific fingerprint image is going to be compressed with the WSQ method. In fact, if one were to select another 140 images and compress them in this same manner, again setting the compression parameter to 9-to-1, one would be very likely achieve a different result that might not center around 15-to-1.

Given this degree of variability, the vendors of automated fingerprint storage systems have to address the problem of achieving the FBI's desired goal of a 15-to-1 compression ratio very carefully. Using a sample, representative fingerprint image database, they must compress all the fingerprint images in the database using the WSQ algorithm with the compression parameter set to different values. They must then perform some type of statistical analysis of the results of these tests to select a compression parameter setting that maximizes the number of images compressed near to 15-to-1.

The problem with this general approach, however, is that the results achieved later on, with actual images captured by the staff of a particular criminal justice agency, may vary from the results achieved by the vendor. Accordingly, computer code must normally be built into a fingerprint storage system using WSQ compression that retains some statistical history of the compression ratios actually achieved during production use of the system. This then enables a technician, as part of regular system maintenance, to adjust the compression parameter's factory setting, thereby complicating system maintenance.

In actual field experience working with images from the equipment of various vendors, the present inventor has found that the compression parameter is frequently adjusted so that the WSQ method achieves, on the average, a compression ratio of 20-to-1 or higher. Thus, two-thirds or more of the fingerprint images may wind up having compression ratios above the FBI's mandated 15-to-1 ratio.

The above paragraphs describe what the present inventor has found to be the generally accepted practice throughout the criminal justice community. The present practice of adjusting a compression parameter to achieve average results permits many fingerprints to be over-compressed, with possible loss of essential information, while many others are under-compressed, placing increased and unnecessary demands upon storage facilities and increasing transmission times.

BRIEF SUMMARY OF THE INVENTION

The invention may be briefly summarized as follows: It can be found in a method for achieving a desired value for the magnitude of compression when compressing the information contained in a digitized fingerprint image. A lossy compression method is used that includes use of a compression parameter whose value may be varied to adjust the amount of compression actually achieved. Briefly summarized, the method comprises selecting a first value for the compression parameter and then performing a first compression of the information contained in a digitized fingerprint image using the first value for the compression parameter and using the lossy compression method, thereby producing a first set of compressed information. Next, a first value for the magnitude of compression is computed from the quantity of information that is contained in the digitized fingerprint image and also from the quantity of information that is contained in the first set of compressed information. Then a first pair of values is formed which first pair includes the first value for the magnitude of compression and the first value for the compression parameter. Interpolation is then performed, using the first pair of values, a second pair of values, and a first new pair of values which first new pair includes the desired value for the magnitude of compression and an as yet unknown first new value for the compression parameter. In this interpolation, a value for this first new value for the compression parameter is determined by computing its value from the remaining five values. Finally, a new compression of the fingerprint image information is performed using this first new value for the compression parameter. This produces a new set of compressed information that is compressed close to the desired value.

DETAILED DESCRIPTION OF EMBODIMENTS OF THE INVENTION

Figure 1:
FIG. 1 is an image of a typical fingerprint.
Figure 2:
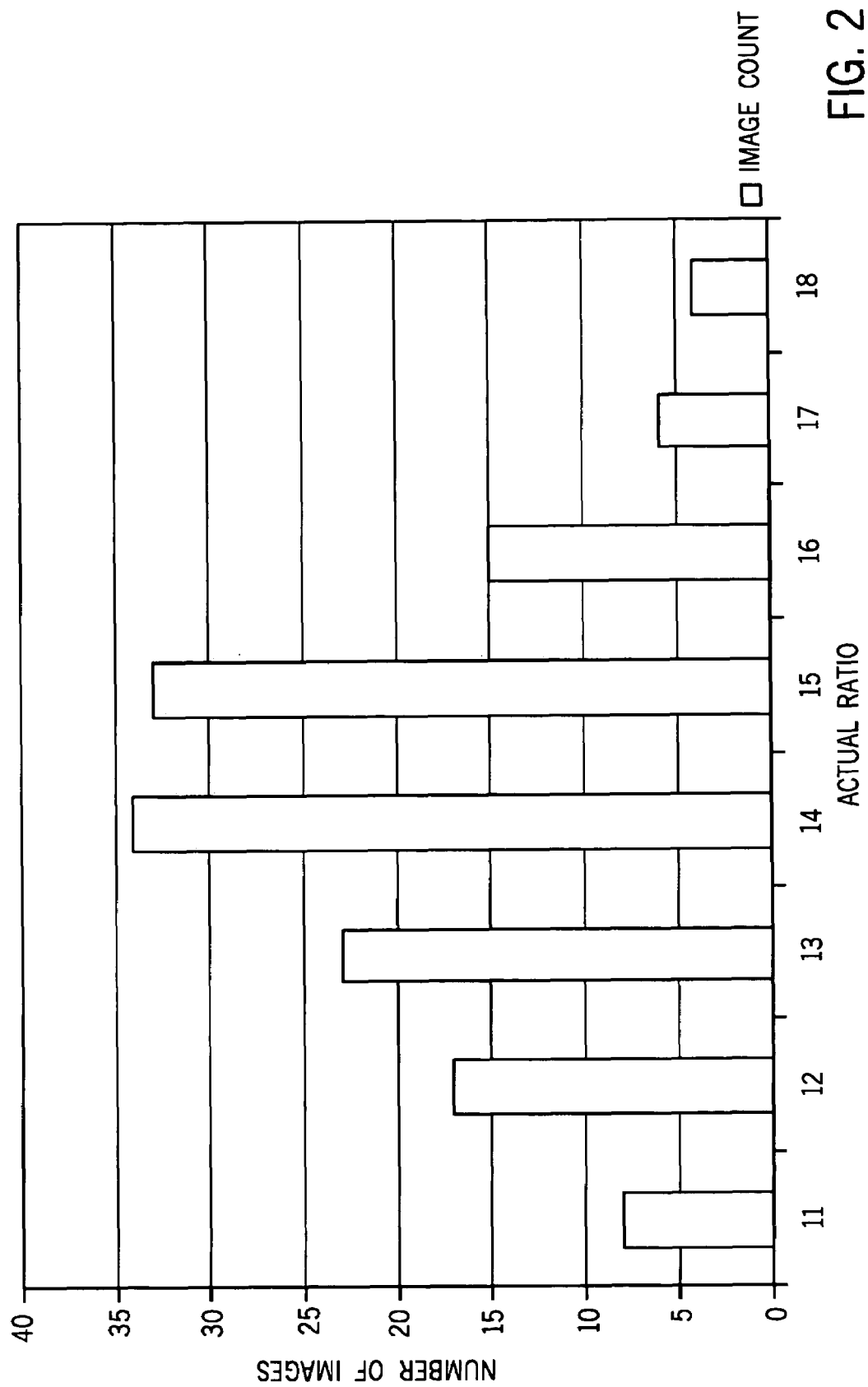
FIG. 2 illustrates, in chart form, the magnitude of compressions achieved (ranging from 18-to-1 down to 11-to-1) when 140 individual fingerprint images are compressed (using the WSQ method) with the compression parameter set at 9-to-1.

The present invention can be implemented as methods for carrying out the compression of digital fingerprint images, as is described below. It can also be implemented as a system that can carry out the described methods. When implemented as a system, the invention can be installed in the offices of a criminal justice agency. Such a system includes a programmed computer having a memory where fingerprint images may be stored along with other information, associated with each set of fingerprints, identifying the individuals whose fingerprint images are stored in the memory—name, other descriptors of an individual, social security and other identification numbers, and possibly CHRI (Criminal History Record Information) as well, although CHRI may be stored elsewhere. The computer would also have a communications facility that would allow fingerprint images and identification information to be transmitted to other criminal justice agencies and also to be received back from them as well. Optionally, the computer could include displays, printers, and fingerprint scanners, but these could also be remotely located and connected to the computer by means of the Internet or some other network. Routines for compressing image information in a lossy manner, including JPEG, WSQ, and possibly other compression routines as well would also be installed upon this computer system. The invention would be implemented by means of compression control routines, especially written to carry out the steps described below and in the drawings, which would call upon the compression routines to perform compression steps, typically passing in to the compression routines some form of compression parameter along with digital fingerprint image data, and typically receiving back compressed fingerprint image information. Routines for uncompressing compressed digital fingerprint image information would also be part of this system.

Figure 3:
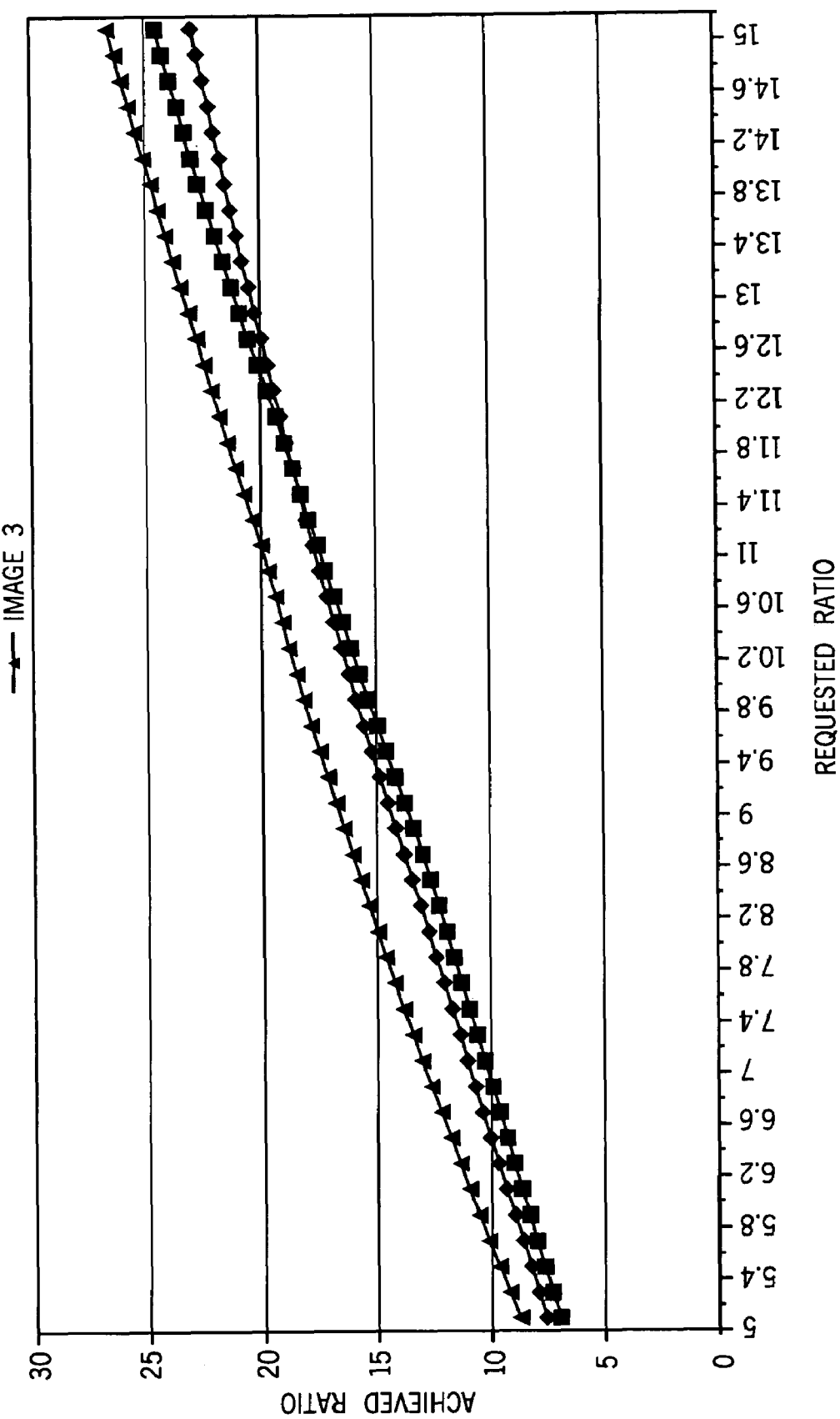
FIG. 3 is a graph illustrating, for three different fingerprint images, the way in which the achieved compression ratio varies with variation of the compression parameter (the requested compression ratio) over the range from 5-to-1 up to 15-to-1 when using the WSQ method of compression.

The principle underlying the present invention is illustrated in FIG. 3. Here, three digitized fingerprint records have been repeatedly compressed using the WSQ method and using requested compression ratios that range all the way from 5-to-1 up to 15-to-1. As is indicated in this figure, the compression ratios actually achieved range from about 7-to-1 up to about 25-to-1. However, the compression ratios actually achieved differ from one fingerprint image to the next, as this graph indicates. (Note that while throughout most of this discussion, and the drawings, the phrase "compression ratio" is used, for example with the value "10" meaning "10-to-1 compression ratio," compression may also be expressed in other ways, for example as a percentage, as in the expression "the information was compressed down to 10% of its original quantity." The phrase "magnitude of compression" means the degree of actual compression achieved, however it may be expressed.)

Looking closely at FIG. 3, the characteristic that should be noted is that all three of the lines, one for each of the three fingerprint images, start near to the lower left corner of the plot and rise smoothly to near the upper right corner. Although these three plotted lines are not exactly straight, all three appear to be very close to being straight lines, and it is possible to determine just how close they are to being straight.

Linear regression allows one to examine the relationship between the requested ratio on the x-axis and the achieved ratio on the y-axis for each of these lines. If the relationship is linear, i.e. it is a straight line, then one should be able to make some predictions about how the corresponding image responds to compression adjustment.

A linear regression of the data underlying the image 1 and plotted in FIG. 3 gives the following equation for the straight line that best fits the observed data:

Achieved ratio=1.564×Requested ratio+0.171.

A regression test reveals how closely the above equation fits the data by developing a number called a "regression coefficient." A regression coefficient value of 0 indicates that there is no relationship at all between the requested ratio and the achieved ratio, while a regression coefficient value of 1.0 means that the above equation fits the data perfectly. In the case of the image 1 in FIG. 3, the regression coefficient was computed to be 0.996. This means that the plotted data points come very close to lying upon the straight line defined by the above equation. Accordingly, the above equation may be used to determine what requested ratio to select in order to achieve a particular value for the achieved ratio.

Next, if one examines the chart of FIG. 3 closely, one sees that the line formed by the plotted points for image 1 parallels the line formed by the plotted points for image 2 all the way from the requested ratio of 5-to-1 up to about the requested ratio of 11.5-to-1. Beyond that point, the line formed by the plotted points for image 2 dips down somewhat. This suggests that the left part of the chart represents a "straighter" line than does the entire width of the chart. Accordingly, if one performs the linear regression on the data between 5-to-1 and 10-to-1 for the image 1, one obtains a slightly different equation for the line that best fits that data:

Achieved ratio=1.729×Requested ratio−1.084.

The regression coefficient in this case is now 0.9999. This is a better fit of the plotted data points, and it suggests that one should concentrate upon regions where the requested ratio is below or equal to 10-to-1 or 11-to-1.

If one solves the above equation for the "requested ratio," one can use the following solution to determine what requested ratio will achieve the desired achieved ratio—in this case, 15-to-1. Doing this one gets:

Requested ratio=(Achieved ratio+1.084)/1.729.

Requested ratio=(15+1.084)/1.729

Requested ratio=9.302

Accordingly, to obtain an achieved 15-to-1 compression ratio, then this equation suggests using 9.302 as the Requested ratio. When we do this, the image is actually compressed to 15.014-to-1, which is very close to 15-to-1.

All of this suggests a method that may be used to achieve compression ratios of very nearly 5-to-1:

1. Compress the image repeatedly over the requested compression ratio range of 5.0-to-1 to 10-to-1.
2. Compute a linear regression on the results, giving an equation for a straight line that best fits the data points.
3. Compute from this equation the compression ratio to request so as to actually obtain an achieved final compression ratio that is very close to 15-to-1.
4. Compress the image one last time using this requested compression ratio.

The method just described is a bit impractical because it requires one to compress each image twenty-six times to obtain the desired result. On a 1 GHz PC, this requires about 9 seconds per image, and accordingly a full set of 14 images would take well over 2 minutes to compress. A method that is less computationally intensive would be desirable.

In the chart presented in FIG. 3, the requested ratio is graphed along the horizontal x-axis, and the achieved ratio is graphed along the vertical y-axis. Suppose that one selects two points, $(x_1, y_1)$ and $(x_2, y_2)$, on the plotted line to serve as the end points of a straight line segment. One then wishes to determine what the requested ratio $(x_3)$ must be to obtain an achieved ratio $(y_3)$ of 15.0-to-1. The following equation provides the answer to this question:

$$X_3=(y_3-y_2)*(x_2-x_1)/(y_2-y_1)+x_2 \quad (1)$$

The choice of starting points merits some discussion, and this discussion is presented at a later point in this description. For now, an arbitrary choice will be made to compress the image first at a requested compression ratio of 5.1-to-1 and then again at a requested compression ratio of 10.0-to-1. This gives: for $(x_1, y_1)$, the values (5.0, 7.55); and for $(x_2, y_2)$, the values (10.0, 16.19). Dropping these values into the above equation and using 15.0 as the value for $y_3$, one obtains a value for $x_3$ of 9.31. As a test, when one compresses the image 1 requesting a 9.31-to-1 compression ratio, one achieves an actual compression ratio of 15.03-to-1. This is considerably closer to the FBI mandated 15-to-1 standard than is generally achieved.

To improve further on this result, one may repeat the compression operation once more, this time using the newly-obtained coordinate set (9.31, 15.03) in place of one of the original starting points for the selected straight line segment. For example, one replaces x2 and y2 in the above computation with 9.31 and 15.03 respectively and then applies the equation once more. Then one obtains the new value of 9.29 for the requested compression ratio, which produces an achieved compression ratio of 14.99 when applied to the image 1.

Thus, after two iterations, one achieves a new achieved compression ratio that is much closer to 15-to-1 than was the previous result. If one applies the equation one more time using both of the newly-obtained points instead of the original two points, one is directed to select a requested compression ratio of 9.299-to-1 which then produces an actually achieved compression ratio of 15.009-to-1.

When this approach was applied to the 140 images in the test set used in constructing the bar graph shown in FIG. 1, an overall average compression ratio of 14.9995-to-1 was achieved. The lowest value achieved was 14.9664-to-1; the highest was 15.0233-to-1; and the standard deviation was 0.0077. This indicates that about two thirds of all the images fell into the actual compression ratio range of 14.995-to-1 plus-or-minus 0.0077-to-1.

Accordingly, a first embodiment of this method of compressing fingerprint images can be described procedurally as follows:

1. Select two control parameter values.
2. Compress the image using these two control parameter values, and then save each of these control parameter values along with the measured actual compression ratios achieved using each value, thus saving two pairs of values.
3. Use the saved two pairs of values, a desired compression ratio, and equation (1) to interpolate a new control parameter value.
4. Compress the image again using the newly-interpolated control parameter value, and then save the interpolated control parameter value along with the measured actual compression ratio achieved using that interpolated value, thus saving one pair of values.
5. Replace one of the original two pairs of saved values with the newly-computed pair of saved values.
6. Repeat steps 3 through 5 zero or more times until the result is satisfactory.

Please note that the "control parameter value" in this case is the requested compression ratio. In other cases, the "control parameter value" may be a control number scaled entirely differently, or it may be numbers within some form or array that may be adjusted in some logical manner to alter the compression ratio that is achieved by a given compression algorithm.

The compression method just described, at the minimum, requires that the image data be compressed three times. The first two compressions are needed to establish the pairs of parameters needed to describe the image's response to variation in the degree of compression. The third compression is then the one that achieves compression very close to the target compression ratio. And if further accuracy is desired or needed, one additional compression is required for each succeeding repetition of the loop (the repeated execution of steps 3 to 5 above).

The method so far developed is entirely usable. However, with the proper selection of the initial starting points, it is possible to eliminate one of two the initial image compressions, thus reducing further the amount of computation that is required.

The above discussion has demonstrated that a straight line is a good approximation to the way in which the compression ratio actually achieved when compressing fingerprint images varies in response to variation in a compression parameter, such as the requested compression ratio when using the WSQ method of compression. Since a straight line can be described fully by any two points, there should be no particular value placed upon exactly which two points are selected to define a given straight line. In the method just described, the initial choice of points are replaced with newly selected, updated points which replace one or more of the originally-selected points and thereby remove them from the final computation.

However, the modeling of the way in which an image's compression ratio varies with variations in some compression parameter as a straight line is simply an approximation to the actual pattern of variation. Accordingly, not all selected starting points will produce equally accurate intermediate or final results. This implies that one may affect the accuracy of the outcome of the initial interpolation by properly selecting the pair of starting points that is used, or at least by properly selecting one of them. For example, using the WSQ method and starting with 9.0-to-1 requested compression ratio as one of the two starting pints, and again working with the 140 sample fingerprint image values, the test set compressed to an average 15.001. Using a 10.0-to-1 requested compression ratio, the test set compressed to 14.999. But the difference here is very small, and different results would certainly be obtained had a different set of fingerprint images been compressed here. Accordingly, although it is possible to select a starting point that give a very precise result with any given test set of fingerprint images, those results are only valid on that particular test set. Therefore, the starting points selected do not need to be that precise as long as they are reasonable.

Earlier, it was demonstrated that the image 1 (plotted in FIG. 3 with diamonds) responded to variations in the amount of compression requested in a way that varied essentially in a straight line manner from a requested compression ratio of 5.0-to-1 up to about 10-to-1 or 11-to-1. After that, although the curve was still relatively straight, the curve began to dip slightly. This behavior is found with most fingerprint images to a greater or lesser degree. For example, and with reference to FIG. 3, the curve plotted through the points of image 3 begins to dip as early as 8-to-1 or 9-to-1 on the graph. This means that a "reasonable" placement the right-hand point along the x-axis in FIG. 3 should be somewhere in the requested compression ratio range of approximately 8-to-1 to 10-to-1 when one is A "reasonable" value selected for use as the left hand point in the initial computation can have a greater impact upon the calculation. One can achieve reasonable results by selecting any reasonable value for the left-hand point that is less than the value of the right hand point. However, it is worthwhile to examine the straight lines a bit more carefully.

Figure 4:
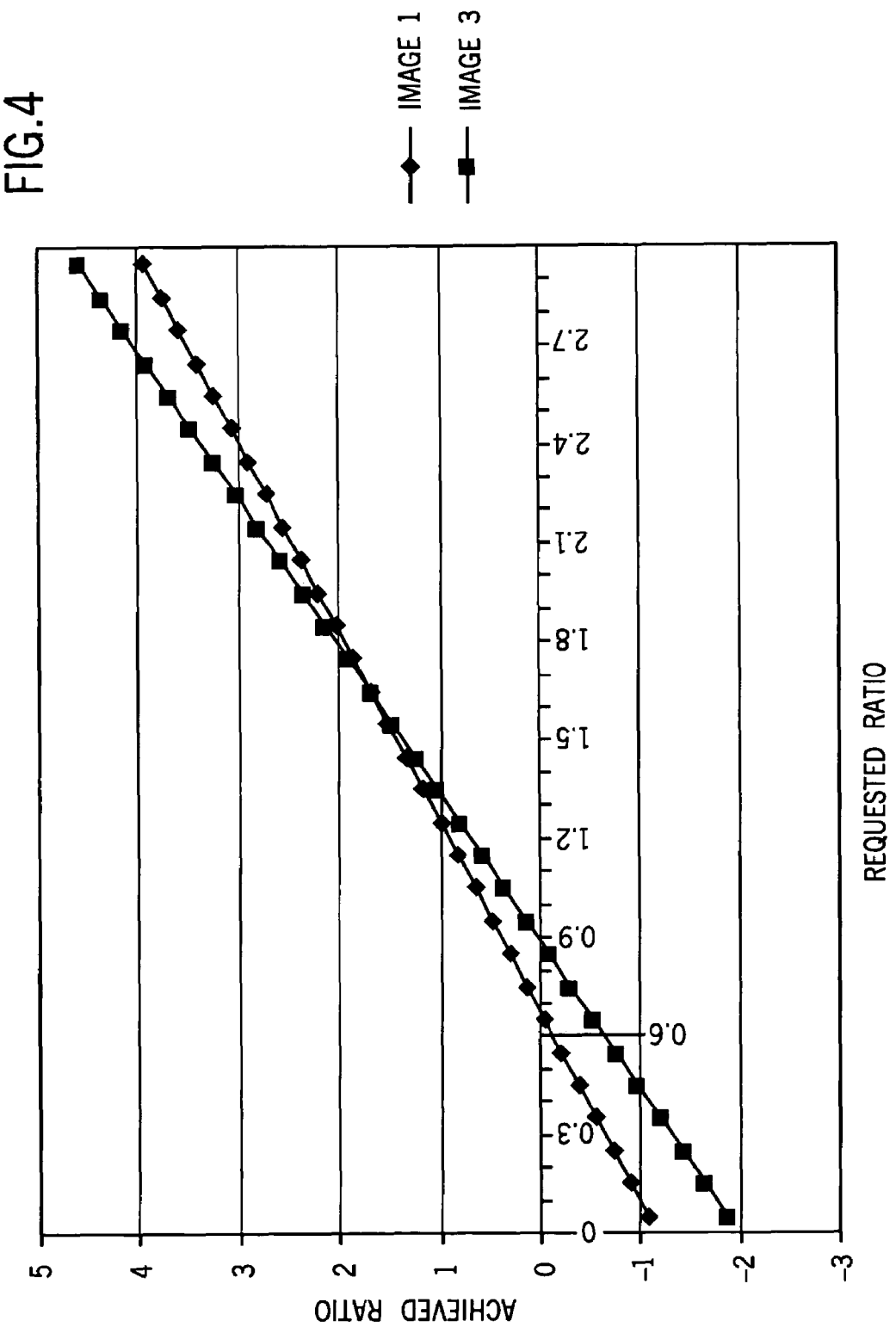
FIG. 4 is a graph illustrating, for two of the three images used in FIG. 3, the way in which the achieved compression ratio varies (in theory) with variation of the compression parameter (the requested compression ratio) over the range from close to zero up to up to 3.0-to-1 when using the WSQ method of compression.

In FIG. 4, a plot illustrates the best-fit straight lines for the left-hand portions of the plots for the fingerprint images 1 and 3 shown in FIG. 3 but extended in FIG. 4 to the left and into the range of requested ratios falling between 0.0-to-1 and 3.0-to-1. (The way in which this plot was generated is explained below. Please note that the image 3 plot in FIG. 3 is marked by triangles, while the image 3 plot in FIG. 4 is marked by squares. The image 1 plot in both FIGS. 3 and 4 is marked by diamonds.) Clearly, there is no real value in compressing an image by only 2-to-1 or 3-to-1 when a 10-to-1 or 15-to-1 compression ratio saves one so much more storage space and provides one with nearly the same quality of result. Indeed, the particular WSQ compression library routines used to generate the results plotted in FIG. 3 report an error when they are supplied with requested compression ratios falling below 2.0-to-1. The usefulness of examining this region comes from observing in FIG. 3 that the two extended straight lines cross at about the requested compression ratio value of 1.7-to-1.

At this requested compression ratio (1.7 to 1), the two different fingerprint images 1 and 3, at least in theory, respond in exactly the same manner to compression. In other words, one may select a compression ratio of 1.7-to-1 as the left-hand point for use with both of these two fingerprint images. The only thing missing is the computation of the achieved compression ratio at this particular point. One cannot actually compress any fingerprint images to find out what the actual compression ratio might be because attempting to do so causes the compression routines to generate an error. One must instead derive the achieved compression ratio by extending the straight lines that best fit the points shown to the left in FIG. 3, extending these lines to the left out of FIG. 3 and into FIG. 4 by extrapolation. From FIG. 4, which was produced by interpolation in this simple manner (and not by WSQ calculation), one can see that the extrapolated actual compression values are approximately 1.7-to-1 where the two straight lines cross each other. Note that at this point on the graph, the requested compression ratio and the achieved compression ratio are nearly the same, and these values are also the same for both of the fingerprint images, image 1 and image 3. It also appears to be the case that this is not simply a coincidence, but the same result follows when other fingerprint images have their plots extrapolated from FIG. 3 into FIG. 4 in this manner.

Accordingly, a linear regression can be performed on each of the 140 test set fingerprint images. From this data, one may calculate the point at which the best fit line gives an achieved ratio equal to the requested ratio. One finds that this point always falls somewhere between 1.0-to-1 and 2.0-to-1 and averages 1.6-to-1. The standard deviation for this value is 0.26, meaning that about two-thirds of all the "break even" points fall between 1.34 and 1.86 in the 140 image test set of fingerprint images. (Other similar methods can be used. For example, with a compression scheme other than WSQ, one having a differently scaled compression parameter, equality of the compression parameter and achieved compression ratio might not be achievable, but one can still determine the compression parameter and achieved compression ratio pair that corresponds to the point in FIG. 3 where 140 plots corresponding to the 140 test set fingerprint images, all plotted as shown in FIG. 3 and then extrapolated into FIG. 4 as just explained, appear to come closest to intersecting in FIG. 3. In such an example, the horizontal coordinate in FIGS. 3 and 4 would presumably be a compression parameter other than a requested compression ratio.)

The implication of this is that all fingerprint images appear, in theory, to behave approximately the same in the theoretical requested compression region that falls between 1.0-to-1 and 2.0-to-1. Thus, one pair of values for the requested compression ratio and the achieved compression ratio for all fingerprint images may be selected as the starting point for interpolation as in equation (1) above.

Accordingly, in a second embodiment of this invention, one begins by selecting a requested compression value within the approximate range of from 1.2-to-1 to 1.9-to-1 as a left-hand requested ratio. Without actually compressing the fingerprint image, one then assumes that the achieved compression ratio is also this same value, justified by the above discussion. In other words, we do not need to do any compression for the left hand point to get the method started. This reduces the minimum computational cost of the method from three compressions to just two compressions. With this refinement, the 140 images of the test set may be rapidly compressed, achieving an average achieved compression ratio of 14.999. To within three decimal places, this is the same average that was achieved using a left-hand point positioned at a requested compression ratio of 5.0-to-1 and with the associated image compression actually performed to determine the second value for this pair of values.

With a compression algorithm other than WSQ, this same basic approach may also be used if linear extrapolation of the plots of that algorithm's compression parameter against actually-achieved compression (comparable to the plot shown in FIG. 3) reveals all of the lines converging, after extrapolation, at or near a single point. Whatever the coordinates of that point, and whether achievable by algorithmic computation or not (and even if in disagreement with some achievable computations carried out far away from the useful range of the algorithm), then those coordinates may be used as the first pair of values, thereby eliminating the need for one of the two initial compression determinations. Naturally, reasonable limits must be placed upon this process.

The value that achieves the "best" result is good only for the specific test set used. Accordingly, there seems to be little to be gained by using 1.678 as opposed to 1.532 or some other such precise value, for example, as the values for one of the pairs of value used initially.

Figure 5:
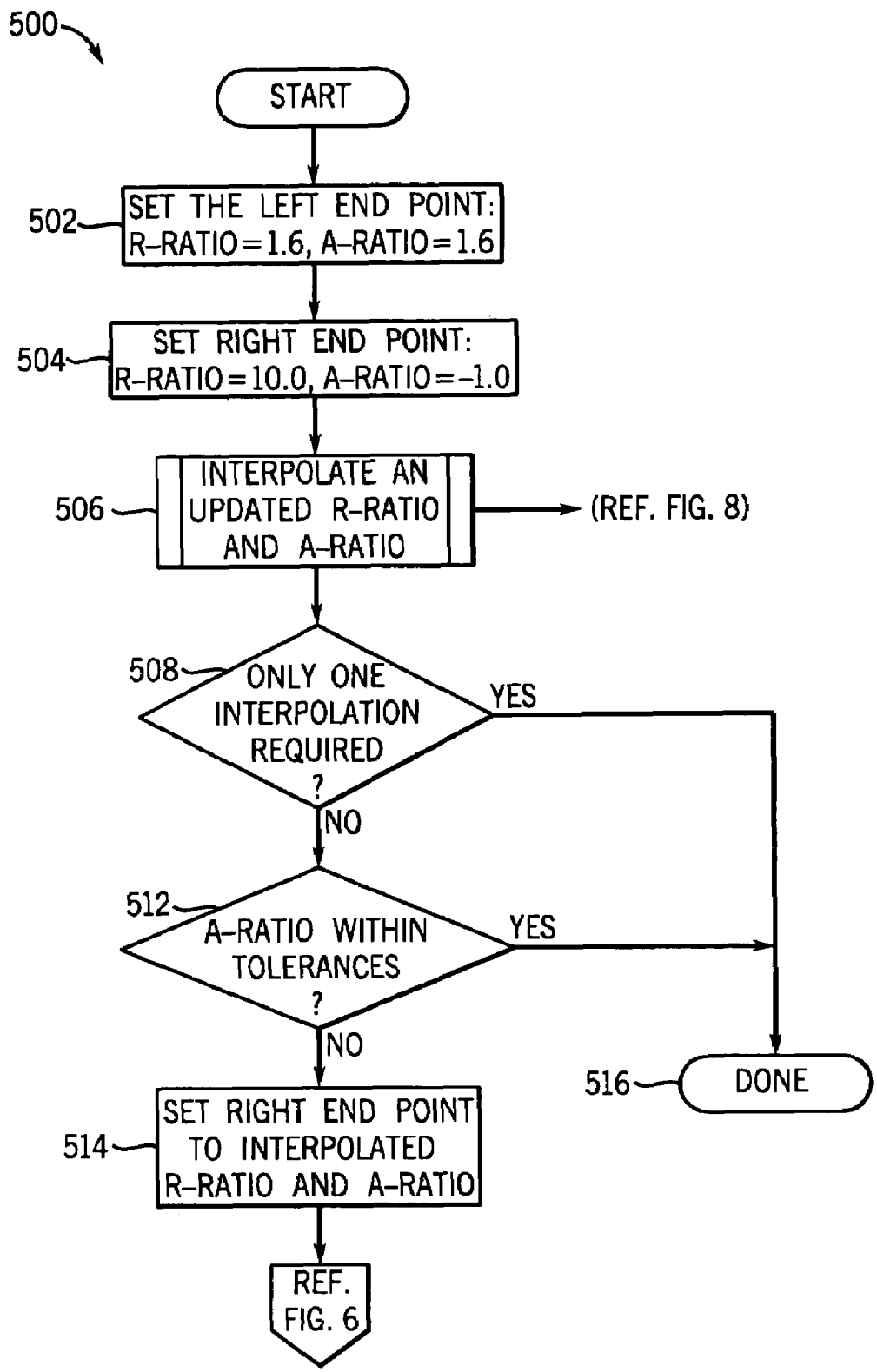
FIG. 5 presents a block diagram of a method for achieving a desired compression ratio for fingerprint images using the WSQ method, including the performance of an interpolation step (see FIG. 8).
Figure 6:
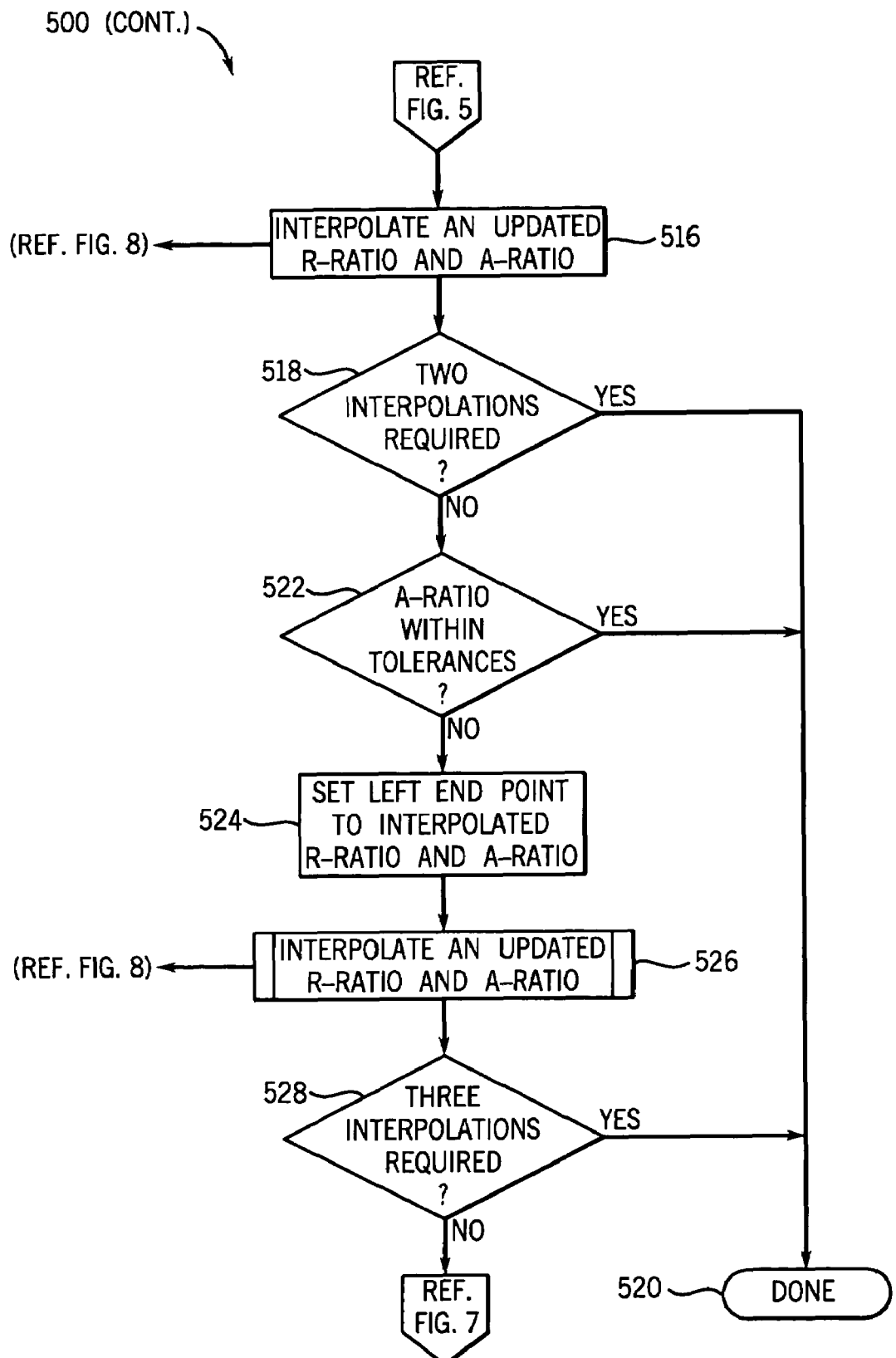
FIG. 6 is a continuation of the method presented in FIG. 5 when a second and possibly a third interpolation step is necessary or desirable.
Figure 7:
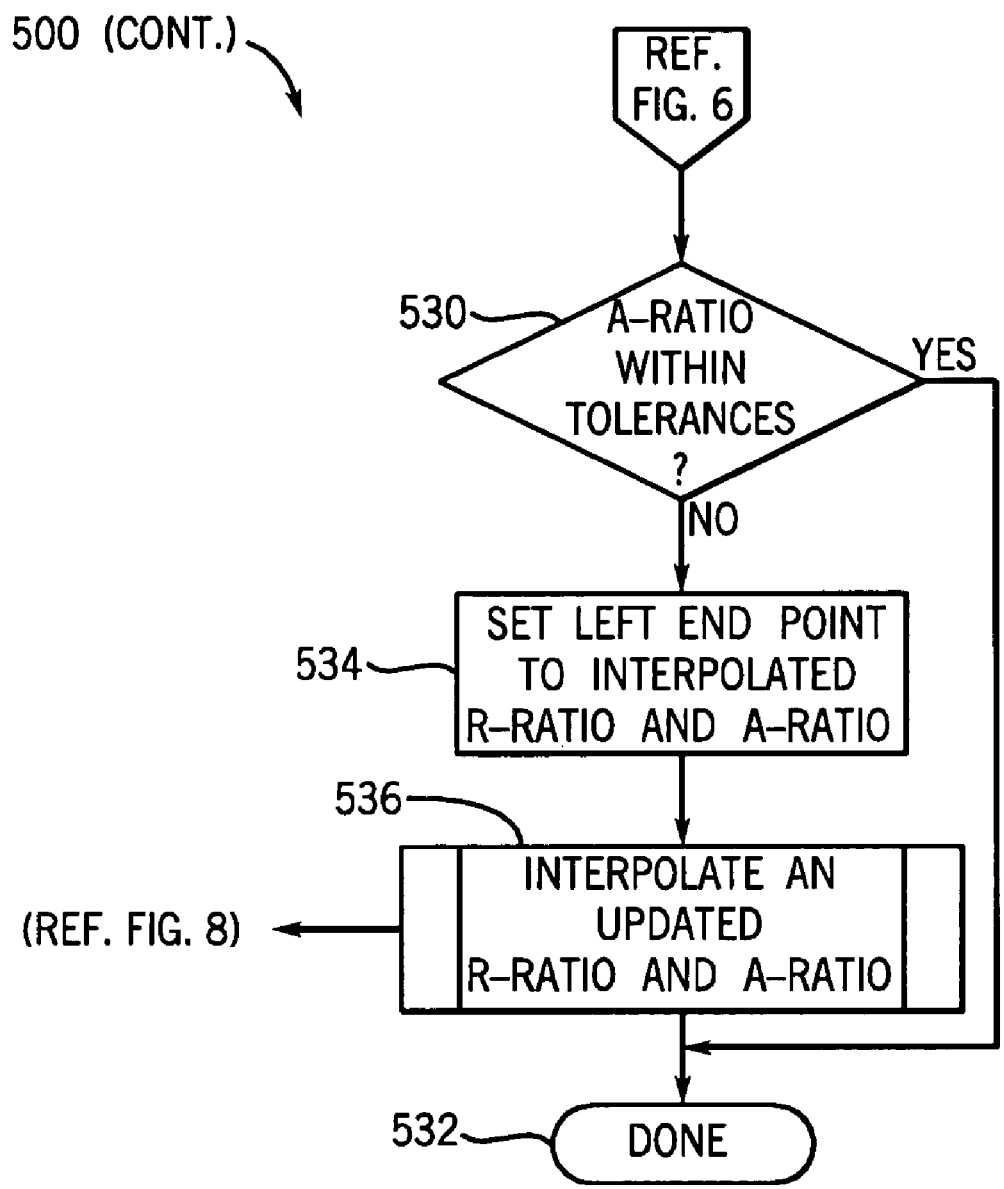
FIG. 7 is a continuation of the method presented in FIGS. 5 and 6 when a fourth interpolation step is necessary or desirable.
Figure 8:
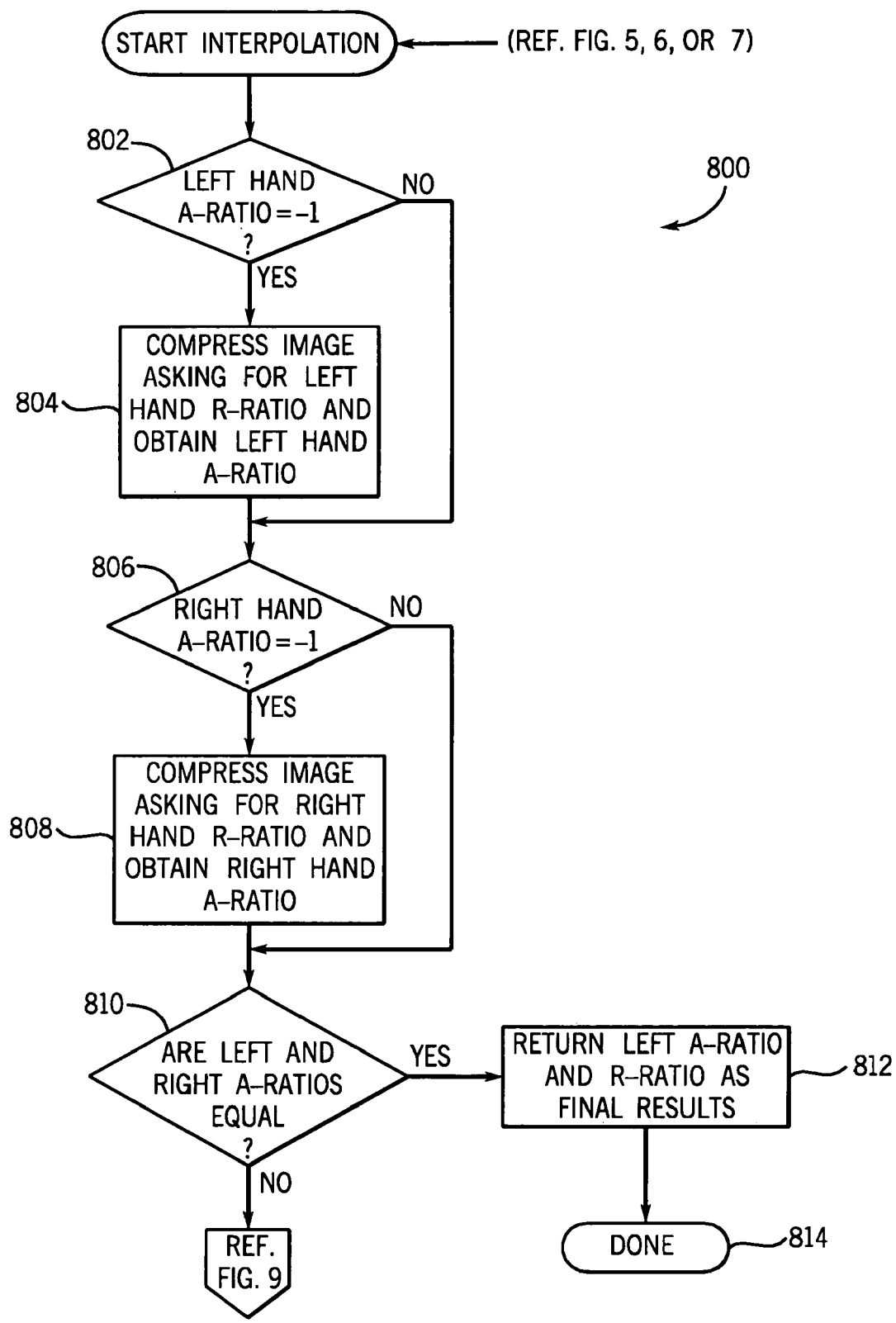
FIG. 8 presents a block diagram of a method for interpolating pairs of data values, first obtaining any missing data values by performing one or two compression operations.

FIGS. 5-9 together form a flowchart of the second embodiment of the compression method, with FIGS. 7-8 outlining the subroutine that performs interpolation and compression to compute a new pair including a new requested ratio and a new achieved ratio.

Referring now to these figures, a routine 500 is shown in FIGS. 5, 6, and 7 which compresses a given fingerprint image down by a specified given compression ratio, in this case the given compression ratio being 15.0-to-1. The fingerprint image is assumed to be represented digitally as a rectangular array of 8-bit grayscale values each representing a pixel, the pixels each representing fingerprint image brightness values spaced apart from each other by $1/500^{th}$ of an inch.

In the drawings and in this discussion, "R-ratio" refers to a requested image compression ratio. "A-ratio" refers to an actually computed obtained image compression ratio. Whenever the WSQ compression method is called upon to compress a fingerprint image, computer routines implementing the WSQ method are called upon to perform this task. These routines are passed the fingerprint image data in non-compressed form, and these routines are also passed the "R-ratio" value which serves as a "compression parameter" that may be adjusted to vary the degree of compression that is achieved. The routines pass back a compressed set of data representing the same fingerprint image. The "A-ratio" value is then computed by dividing the number of data bytes used to represent the uncompressed fingerprint image by the number of data bytes returned by the WSQ routines and used to represent the same fingerprint image in compressed form. The WSQ routines are called upon at least twice, and possibly three or four times. The final time these routines are called upon, the returned compressed fingerprint image data is returned as the final result of fingerprint image compression.

The compression process begins at steps 502 and 504 in FIG. 5, where two points along a hypothetical straight line are selected. Assuming, for example, that the fingerprint image data being processed corresponds to image 1 shown plotted in FIGS. 3 and 4, the two points would fall along a straight line passing approximately through all of the image 1 data points shown in FIG. 3, with the line being extended into FIG. 4 as shown.

In step 502, a left-end point on this line is set to coordinates X=1.6 and Y=1.6. This means an assumption (explained above) is made that the straight line for Image 1 passes through the point (1.6, 1.6) in FIG. 4. Accordingly, for this first (left-end) data point on the line, the R-ratio is set to a requested compression ratio of 1.6-to-1, and the A-ratio is presumed to be set to an actual compression ratio of 1.6-to-1, the same value. Accordingly, since the actual compression ratio is presumed to be known and to be equal to the requested compression ratio, there is no need to perform a first actual computation of an actual compression ratio corresponding to this first pair of values defining a left end point on the line.

In step 504, a right end point on this same line is set to the X coordinate 10.0. This means the right end point falls at the coordinate value R-ratio=10.0 or requested compression ratio equal to 10.0-to-1. The Y coordinate must be computed using the WSQ compression algorithm. Accordingly, the Y coordinate value is temporarily set to the value A-ratio=−1, meaning this value must be computed.

In step 506, the interpolation and compression routine 800 (FIGS. 8 and 9) is called upon, and it calls twice upon the WSQ routines to compress the image data twice, the first time with the R-ratio set to 10.0-to-1.

With reference to FIG. 8, the two steps 802 and 806 determine that only the right-hand A-ratio is equal to −1; so at step 808 the interpolation and compression routine 800 calls upon the WSQ compression routines to compress the fingerprint image data governed by a requested compression ratio of 10.0-to-1. The amount of compression achieved is then computed and is saved as a right-hand value A-ratio (achieved compression ratio).

Figure 9:
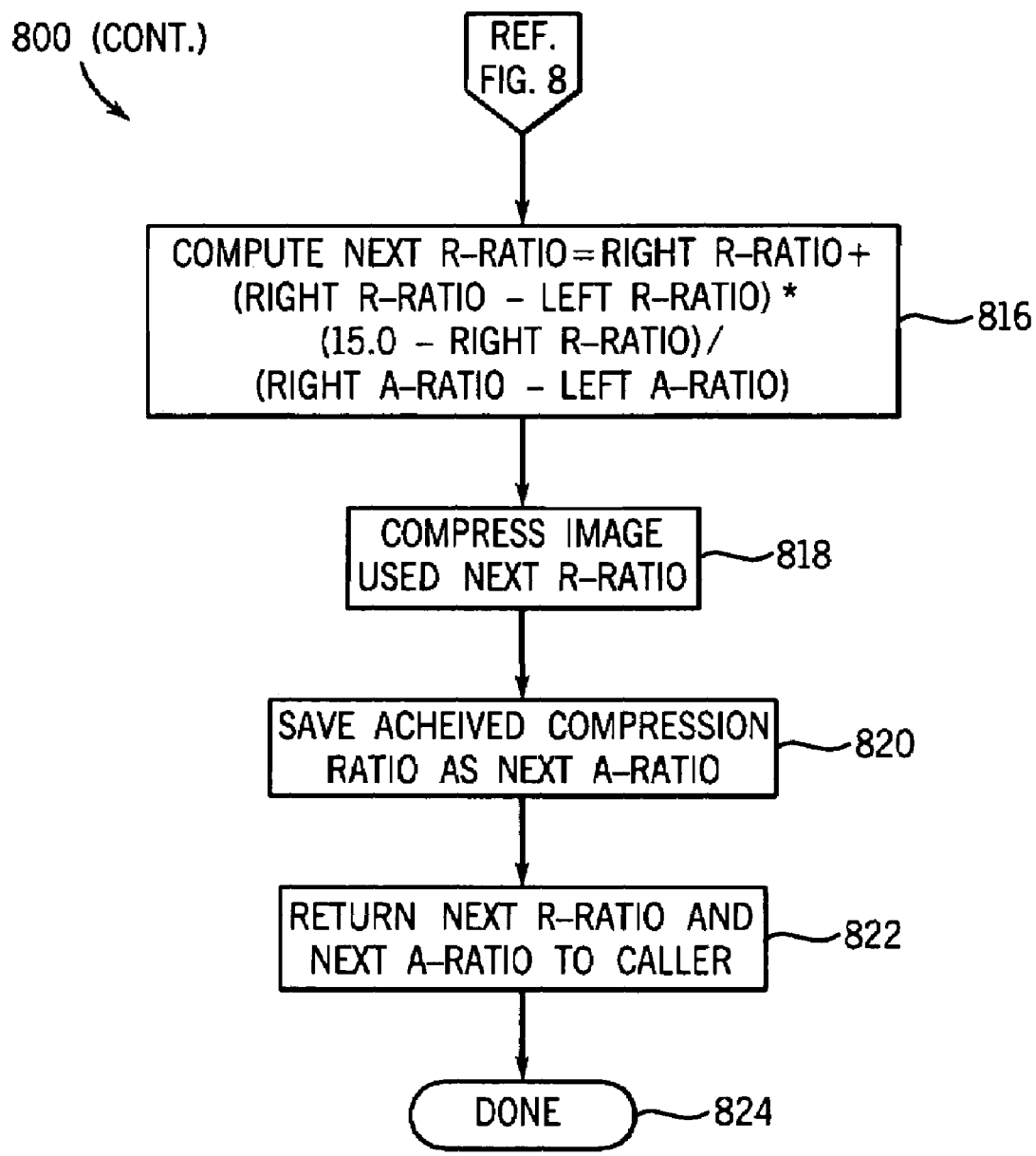
FIG. 9 is a continuation of the method presented in FIG. 8, including the interpolation step plus the step of obtaining a data value by performing a compression operation.

At step 810, since at this point the A-ratios are not equal, program control proceeds to step 816 in FIG. 9.

Step 816 is the interpolation step. At this point, the left point on the line has the coordinates (1.6, 1.6) and the right point on the line has the coordinates (10.0, right A-ratio) where "A-ratio" is the actual compression ratio achieved by the compression step 808. The interpolation step finds a new point on the line defined by the left and right points, and it computes (along the X axis of FIGS. 3 and 4) a value for the requested compression ratio, or "next R-ratio," which is chosen to give an actual compression ratio very close to the optimum 15-to-1 mandated by the FBI. The interpolation step, as is indicated at 816 in FIG. 8, simply evaluates the interpolation equation (set forth and explained above and repeated here for convenience):

$$X_3 = (y_3 - y_2)*(x_2 - x_1)/(y_2 - y_1) + x_2 \qquad (1)$$

Rewritten in the notation of FIG. 8, this becomes:

$$\text{next } R \text{ ratio} = (150 - \text{right } A \text{ ratio}) * (\text{right } R \text{ ratio} - \text{left } R \text{ ratio}) / \qquad (2)$$
$$(\text{right } A \text{ ratio} - \text{left } A \text{ ratio}) + \text{right } R \text{ ratio}$$

Here, "15.0" is the desired, or ideal, center A ratio value, in this case the value actually mandated by the FBI. The interpolation takes the two "known" points on the line, the left point (left R ratio, left A ratio) and the right point (right R ratio, right A ratio), plus the desired Y coordinate value "15" for a central point whose X coordinate value "next R-ratio" is unknown. This equation simply is solved for the X value of the central point, "next R-ratio." This equation becomes:

$$\text{next } R \text{ ratio}=(15.0-\text{right } A \text{ ratio})*(10.0-1.6)/(\text{right } A \text{ ratio}-1.6)+1 \quad (3)$$

Accordingly, "next R ratio," the X coordinate of a central point, is readily computed from this equation plus the value "right A ratio" which is the compression ratio that was just computed following the compression step carried out at step 808 above. This "next R ratio" is the desired "requested compression ratio" value which the first interpolation (performed at step 816) indicates will, when passed in as a compression parameter to the WSQ routines, force those routines to achieve an actual compression ratio very close to the desired compression ratio of 15-to-1.

The next step, at step 818, actually calls upon the WSQ routines to perform compression of the fingerprint image information a second time, this time setting the requested compression ratio parameter equal to the result of the interpolation computation (the value "next R ratio"). At step 820, the compression ratio actually achieved is computed and is stored as the value of the next a-ratio, in case further computations will be used to increase the accuracy of the amount of compression achieved in another iteration through this algorithm. Then, at step 822, the compressed image information is returned, along with the values "next R ratio" and next A ratio" in case further interpolations and compressions are carried out to achieve even greater precision in the amount of compression achieved. At this point, the value "next A-ratio", will already be very close to the desired 15.0-to-1 in most cases.

The interpolation and compression routine 800 having completed its work at step 824, returning the computed new pair of values "next R-ratio" and "next A-ratio" at step 822, program control next commences with the step 508 back in FIG. 5. The target compression ratio was 15; the actual compression ratio achieved after two compressions of the information is the value "next A-ratio" returned from the interpolation and compression routine 800. At the step 512, the compression ratio actually achieved "next A-ratio" is compared to 15.0. If the error is less than some predetermined acceptable value or if only the one interpolation step is to be performed (step 508), then in either case, the task is finished (step 516). The compressed fingerprint information, compressed by the call to the WSQ routines performed at step 818 in FIG. 9, is returned as the result of all of this computation.

If more than one interpolation is permitted to gain a more accurate result, and if the result achieved so far is not yet close enough to the desired 15-to-1 compression ratio (steps 508 and 512), then program control continues at step 516 in FIG. 6. Here, the interpolation and compression routine 800 (FIGS. 8 and 9) is called upon again. This time, the "next R-ratio" and "next A-ratio" values are assigned as the new values of the variables "right R-ratio" and "right A-ratio" (step 514), while the values of the variables "left k-ratio" (equal to "1.6") and "left A-ratio" (also equal to "1.6") remain unchanged. Since neither left A-ratio nor right A-ratio equals minus one this time, and assuming these values are not equal (which would terminate this process, since the two points on the curve would then be the same point, so no intermediate point could be found), then program control proceeds (via steps 802, 806, and 810) right past the unexecuted steps 804 and 808 in FIG. 8 and right on to the interpolation step 816 at the top of FIG. 9. At this point, all the steps shown in FIG. 9 are repeated again, as described above. Briefly summarized, interpolation locates a new point, with X coordinate "next R-ratio" and Y-coordinate "next A-ratio" (computed by the compression step 818) and returns these two new values, plus a newly-compressed version of the fingerprint image information, to FIG. 6. At steps 518 and 522, if two interpolations is the limit, or if the computed compression is now within tolerance limits, the program stops at step 520, returning the compressed data just computed in step 818 in FIG. 8.

But if the compression ratio achieved is still not accurate enough, another interpolation is performed at step 526, and the results checked by the steps 528 and 530 (FIG. 7). If all is now OK, then program control terminates either at step 520 or 532. But if more accurate control of the compression process is still desired, then the interpolation and compression routine 800 can be called upon yet again at step 536.

Note that just before the interpolation and compression routine 800 is called upon by the two steps 526 (FIG. 6) and 536 (FIG. 7), the two steps 524 (FIG. 6) and 534 (FIG. 7) respectively preceding the two steps 526 and 536 adjust the parameters passed into the interpolation and compression routine 800 as follows: The "next R-ratio" and "next A-ratio" values are assigned as the new values of the variables "left R-ratio" and "left A-ratio", while the values of the variables "right R-ratio" and "right A-ratio" remain unchanged.

Although specific embodiments have been illustrated and described, it will be appreciated by those skilled in the art that any arrangement which is calculated to achieve the same purpose as the methods just described may be substituted for the specific embodiments shown here. This application is intended to cover any and all such adaptations or variations of the present invention that fall within the scope of the claims annexed to and forming a part of this specification.

The invention claimed is:

1. A method for achieving a desired value for the magnitude of compression when compressing the information contained in a digitized fingerprint image using a lossy compression method that includes use of a compression parameter whose value may be varied to adjust the amount of compression actually achieved, the method comprising:

selecting a first value for the compression parameter;

performing a first compression of the information contained in a digitized fingerprint image using the first value for the compression parameter and using the lossy compression method, thereby producing a first set of compressed information;

computing a first value for the magnitude of compression from the quantity of information contained in the digitized fingerprint image and the quantity of information contained in the first set of compressed information;

forming a first pair of values which first pair includes the first value for the magnitude of compression and the first value for the compression parameter;

interpolating, using the first pair of values, a second pair of values, and a first new pair of values which first new pair includes the desired value for the magnitude of compression and an as yet unknown first new value for the compression parameter to determine a value for this first new value for the compression parameter by computing its value from the remaining five values; and performing a first new compression of the fingerprint image information using this first new value for the compression parameter to produce a first new set of compressed information;

whereby the first new set of compressed information is compressed close to the desired value for the magnitude of compression.

2. A method in accordance with claim 1 further comprising:

as a preliminary step, selecting a second value for the compression parameter and a second value for the magnitude of compression such that the lossy compression method, when applied using this second value for the compression parameter to compress large numbers of digitized fingerprint images, achieves a magnitude of compression generally in accord with this second value for the magnitude of compression; and forming the second pair of values which second pair includes the second value for the magnitude of compression as well as this second value for the compression parameter.

3. A method in accordance with claim 2 wherein the lossy compression method is WSQ and wherein the second value for the magnitude of compression, when expressed as a compression ratio, falls within the range of 1 to 2.

4. A method in accordance with claim 3 wherein the second value for the compression parameter is selected to be about equal to the second value for magnitude of compression.

5. A method in accordance with claim 2 wherein the lossy compression method is WSQ and wherein the second value for the magnitude of compression, when expressed as a compression ratio, falls within the range of 1.3 to 1.9.

6. A method in accordance with claim 5 wherein the second value for the compression parameter is selected to be about equal to the second value for the magnitude of compression.

7. A method in accordance with claim 2 wherein the lossy compression method is WSQ and wherein the second value for the magnitude of compression, when expressed as a compression ratio, is close to 1.6.

8. A method in accordance with claim 7 wherein the second value for the compression parameter is selected to be about equal to the second value for the magnitude of compression.

9. A method in accordance with claim 2 which further comprises:

computing a first new value for the magnitude of compression from the quantity of information contained in the digitized fingerprint image and the quantity of information contained in the first new set of compressed information;

forming a first new pair of values which first new pair includes the first new value for the magnitude of compression and the first new value for the compression parameter;

interpolating, using the first pair of values, the first new pair of values, and a second new pair of values which second new pair includes the desired magnitude of compression and an as yet unknown second new value for the compression parameter, to determine a value for this second new value for the compression parameter computed from the other five values; and performing a second new compression of the fingerprint image information using this second new value for the compression parameter, to produce a second new set of compressed information.

10. A method in accordance with claim 9, wherein the three final steps defined by claim 9 are only carried out if the first new value for the magnitude of compression is unacceptably far from the desired value for the magnitude of compression.

11. A method in accordance with claim 10 comprising:

computing a second new value for the magnitude of compression from the quantity of information contained in the digitized fingerprint image and the quantity of information contained in the second new set of compressed information; and if the second new value for the magnitude of compression is unacceptably far from the desired value for the magnitude of compression, performing the following additional steps:

forming a second new pair of values which second new pair includes the second new value for the magnitude of compression and the second new value for the compression parameter;

interpolating, using the firs new pair of values, the second new pair of values, and a third new pair of values which third new pair includes the desired magnitude of compression and an as yet unknown second new value for the compression parameter, to determine a value for this third new value for the compression parameter computed from the other five values in the three pairs; and performing a second new compression of the fingerprint image information using this second new value for the compression parameter, to produce a third new set of compressed information.

12. A method in accordance with claim 1 which further comprises:

selecting a second value for the compression parameter;

performing a second compression of the same information using the second value for the compression parameter, thereby producing a second set of compressed information;

computing a second value for the magnitude of compression from the quantity of information contained in the same information and the quantity of information contained in the second set of compressed information; and forming the second pair of values which second pair includes the second value for the magnitude of compression along with the second value for the compression parameter.

13. A method in accordance with claim 12 which further comprises:

computing a first new value for the magnitude of compression from the quantity of information contained in the digitized fingerprint image and the quantity of information contained in the first new set of compressed information;

forming a first new pair of values which first new pair includes the first new value for the magnitude of compression and the first new value for the compression parameter;

interpolating, using either the first or the second pair of values, the first new pair of values, and a second new pair of values which second new pair includes the desired magnitude of compression and an as yet unknown second new value for the compression parameter, to determine a value for this second new value for the compression parameter computed from the other five values; and performing a second new compression of the fingerprint image information using this second new value for the compression parameter, to produce a second new set of compressed information.

14. A method in accordance with claim 13, wherein the three final steps defined by claim 9 are only carried out if the first new value for the magnitude of compression is unacceptably far from the desired value for the magnitude of compression.

15. A method in accordance with claim 14 comprising:
computing a second new value for the magnitude of compression from the quantity of information contained in the digitized fingerprint image and the quantity of information contained in the second new set of compressed information; and
if the second new value for the magnitude of compression is unacceptably far from the desired value for the magnitude of compression, performing the following additional steps:
forming a second new pair of values which second new pair includes the second new value for the magnitude of compression and the second new value for the compression parameter;
interpolating, using the first new pair of values, the second new pair of values, and a third new pair of values which third new pair includes the desired magnitude of compression and an as yet unknown second new value for the compression parameter, to determine a value for this third new value for the compression parameter computed from the other five values in the three pairs; and
performing a second new compression of the fingerprint image information using this second new value for the compression parameter, to produce a third new set of compressed information.

16. A system that can store, retrieve, transmit, and receive digitized fingerprint images and also compress and decompress such images, achieving a desired value for the magnitude of compression when compressing fingerprint images using a lossy compression method that includes use of a compression parameter whose value may be varied to adjust the amount of compression actually achieved, the system comprising:
a programmed computer having a memory where fingerprint image information may be stored along with information identifying the individuals whose fingerprint images are stored in the memory, and also having a communications facility that can transmit and receive fingerprint image information to and from remote sites;
compression routines installed on the programmed computer for carrying out at least one lossy method of compression that can compress digitized fingerprint images to facilitate their storage or transmission or both and that respond to adjustment of an incoming compression parameter argument by varying the degree of compression;
decompression routines installed on the programmed computer for uncompressing digitized fingerprint images; and
compression control routines installed on the programmed computer that contain instructions which call upon the compression routines and carry out steps comprising:
selecting a first value for the compression parameter;
calling upon the compression routines to perform a first compression of the information contained in a digitized fingerprint image using the first value for the compression parameter, thereby producing a first set of compressed information;
computing a first value for the magnitude of compression from the quantity of information contained in the digitized fingerprint image and the quantity of information contained in the first set of compressed information;
forming a first pair of values which first new pair includes the first value for the magnitude of compression and the first value for the compression parameter;
interpolating, using the first pair of values, a second pair of values, and a first new pair of values which first new pair includes the desired value for the magnitude of compression and an as yet unknown first new value for the compression parameter to determine a value for this first new value for the compression parameter by computing its value from the remaining five values; and
calling upon the compression routines to perform a first new compression of the fingerprint image information using this first new value for the compression parameter to produce a first new set of compressed information;
whereby the first new set of compressed information is compressed close to the desired value for the magnitude of compression.

17. A system in accordance with claim 16 wherein the steps carried out by the compression control routines further comprise:
as a preliminary step, selecting a second value for the compression parameter and a second value for the magnitude of compression such that the lossy compression method, when applied using this second value for the compression parameter to compress large numbers of digitized fingerprint images, achieves a magnitude of compression generally in accord with this second value for the magnitude of compression; and
forming the second pair of values which second pair includes this second value for the magnitude of compression as well as this second value for the compression parameter.

18. A system in accordance with claim 17 wherein the lossy compression routines implement the WSQ compression method and wherein the second value for the magnitude of compression, when expressed as a compression ratio, falls within the range of 1 to 2.

19. A system in accordance with claim 18 wherein the second value for the compression parameter is selected to be about equal to the second value for magnitude of compression.

20. A system in accordance with claim 17 wherein the lossy compression method is WSQ and wherein the second value for the magnitude of compression, when expressed as a compression ratio, falls within the range of 1.3 to 1.9.

21. A system in accordance with claim 20 wherein the second value for the compression parameter is selected to be about equal to the second value for the magnitude of compression.

22. A system in accordance with claim 17 wherein the lossy compression routines implement the WSQ method and wherein the second value for the magnitude of compression, when expressed as a compression ratio, is close to 1.6.

23. A system in accordance with claim 22 wherein the second value for the compression parameter is selected to be about equal to the second value for the magnitude of compression.

24. A system in accordance with claim 17 wherein the steps carried out by the compression control routines further comprise:

computing a first new value for the magnitude of compression from the quantity of information contained in the digitized fingerprint image and the quantity of information contained in the first new set of compressed information;

forming a first new pair of values which first new pair includes the first new value for the magnitude of compression and the first new value for the compression parameter;

interpolating, using the first pair of values, the first new pair of values, and a second new pair of values which second new pair includes the desired magnitude of compression and an as yet unknown second new value for the compression parameter, to determine a value for this second new value for the compression parameter computed from the other five values; and performing a second new compression of the fingerprint image information using this second new value for the compression parameter, to produce a second new set of compressed information.

25. A system in accordance with claim 24, wherein the three final steps defined by claim 24 are only carried out if the first new value for the magnitude of compression is unacceptably far from the desired value for the magnitude of compression.

26. A system in accordance with claim 25 wherein the steps carried out by the compression control routines further comprise:

computing a second new value for the magnitude of compression from the quantity of information contained in the digitized fingerprint image and the quantity of information contained in the second new set of compressed information; and if the second new value for the magnitude of compression is unacceptably far from the desired value for the magnitude of compression, performing the following additional steps:

forming a second new pair of values which second new pair includes the second new value for the magnitude of compression and the second new value for the compression parameter;

interpolating, using the first new pair of values, the second new pair of values, and a third new pair of values which third new pair includes the desired magnitude of compression and an as yet unknown second new value for the compression parameter, to determine a value for this third new value for the compression parameter computed from the other five values in the three pairs; and calling upon the compression routines to perform a second new compression of the fingerprint image information using this second new value for the compression parameter, to produce a third new set of compressed information.

27. A system in accordance with claim 16 wherein the steps carried out by the compression control routines further comprise:

performing a second compression of the same information using the second value of the compression parameter, thereby producing a second set of compressed information;

computing a second magnitude of compression from the quantity of information contained in the same information and the quantity of information contained in the second set of compressed information; and forming the second pair of values which second pair includes the second magnitude of compression along with the second value of the compression parameter.

28. A system in accordance with claim 17 wherein the steps carried out by the compression control routines further comprise:

computing a first new value for the magnitude of compression from the quantity of information contained in the digitized fingerprint image and the quantity of information contained in the first new set of compressed information;

forming a first new pair of values which first pair includes the first new value for the magnitude of compression and the first new value for the compression parameter;

interpolating, using the first or the second pair of values, the first new pair of values, and a second new pair of values which second new pair includes the desired magnitude of compression and an as yet unknown second new value for the compression parameter, to determine a value for this second new value for the compression parameter computed from the other five values; and performing a second new compression of the fingerprint image information using this second new value for the compression parameter, to produce a second new set of compressed information.

29. A system in accordance with claim 28, wherein the three final steps defined by claim 28 are only carried out if the first new value for the magnitude of compression is unacceptably far from the desired value for the magnitude of compression.

30. A system in accordance with claim 29 wherein the steps carried out by the compression control routines comprise:

computing a second new value for the magnitude of compression from the quantity of information contained in the digitized fingerprint image and the quantity of information contained in the second new set of compressed information; and if the second new value for the magnitude of compression is unacceptably far from the desired value for the magnitude of compression, performing the following additional steps:

forming a second new pair of values which second new pair includes the second new value for the magnitude of compression and the second new value for the compression parameter;

interpolating, using the first new pair of values, the second new pair of values, and a third new pair of values which third new pair includes the desired magnitude of compression and an as yet unknown second new value for the compression parameter, to determine a value for this third new value for the compression parameter computed from the other five values in the three pairs; and calling upon the compression routines to perform a second new compression of the fingerprint image information using this second new value for the compression parameter, to produce a third new set of compressed information.

* * * * *